(12) United States Patent
Heimbaugh

(10) Patent No.: US 7,633,702 B1
(45) Date of Patent: Dec. 15, 2009

(54) METHOD AND APPARATUS FOR POWERING VOICE COIL MOTOR RETRACT CIRCUIT WHILE BRAKING SPINDLE

(75) Inventor: Mark Heimbaugh, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1330 days.

(21) Appl. No.: 09/820,415

(22) Filed: Mar. 29, 2001

Related U.S. Application Data

(60) Provisional application No. 60/193,966, filed on Mar. 31, 2000.

(51) Int. Cl.
 *G11B 21/02* (2006.01)
(52) U.S. Cl. .......................................... 360/75
(58) Field of Classification Search ................ 360/69, 360/75, 73.03; 318/254, 560, 563; 323/222
See application file for complete search history.

(56) References Cited

U.S. PATENT DOCUMENTS

| | | | | |
|---|---|---|---|---|
| 4,679,102 A | * | 7/1987 | Wevers et al. ................ | 360/75 |
| 4,786,995 A | * | 11/1988 | Stupeck et al. ............... | 360/75 |
| 4,831,469 A | * | 5/1989 | Hanson et al. ................ | 360/75 |
| 5,455,496 A | * | 10/1995 | Williams et al. ............. | 318/563 |
| 5,889,629 A | * | 3/1999 | Patton, III .................... | 360/75 |
| 5,959,439 A | * | 9/1999 | Shenai et al. ................ | 323/222 |
| 6,025,968 A | * | 2/2000 | Albrecht ....................... | 360/75 |
| 6,181,502 B1 | * | 1/2001 | Hussein et al. ............... | 360/75 |
| 6,560,057 B1 | * | 5/2003 | Klaassen et al. .............. | 360/75 |
| 6,574,062 B1 | * | 6/2003 | Bennett et al. ................ | 360/69 |
| 6,594,102 B1 | * | 7/2003 | Kanda et al. ................. | 360/75 |
| 2001/0024339 A1 | * | 9/2001 | Yaegashi ...................... | 360/75 |

* cited by examiner

*Primary Examiner*—K. Wong
(74) *Attorney, Agent, or Firm*—Hensley Kim & Holzer, LLC

(57) ABSTRACT

An apparatus for powering a voice coil motor retract circuit in a disk drive is disclosed. The apparatus allows a disk drive to power the voice coil motor retract circuit while also slowing the spinning disk. A DC-to-DC converter converts the back electromotive force from the spinning disk into voltage which drives the retract circuit. A feedback circuit controls the switching of the DC-to-DC converter based on the available voltage for performing the retract function. Importantly, the DC-to-DC converter allows the disk to be slowed while simultaneously providing power to the retract circuit. In one embodiment, the windings of the spindle motor are used as the inductor element in the DC-to-DC converter. The power MOSFETs associated with the spindle motor are used as the diode unit and the switch unit of the DC-to-DC converter. The power supply capacitor is used as the output capacitor of the DC-to-DC converter. The feedback circuit provides a fixed off time in which energy is transferred from the spindle motor windings into the DC-to-DC converter output capacitor, and a minimum on time in which energy is allowed to build in the spindle motor windings. A method for powering the voice coil motor retract circuit while braking the disk is also disclosed.

31 Claims, 9 Drawing Sheets

METHOD AND APPARATUS FOR POWERING VOICE COIL MOTOR RETRACT CIRCUIT WHILE BRAKING SPINDLE

Priority is claimed from U.S. Provisional Patent No. 60/193,966, filed Mar. 31, 2000 entitled "Method For Powering VCM Retract Circuit While Braking Spindle," which is incorporated by reference in its entirety.

FIELD OF THE INVENTION

The present invention relates to disk drive powering circuits and, more particularly, to a method and apparatus for providing power to a voice coil motor retract circuit when power is lost in a disk drive.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. The disk is rotated by a spindle motor at high speed which allows the transducer to access different sectors on the disk.

A diagrammatic representation of a conventional disk drive, generally designated 10, is illustrated in FIG. 1. The disk drive comprises a disk 12 that is rotated by a spindle motor 14. The spindle motor 14 is mounted to a base plate 16. An actuator arm assembly 18 is also mounted to the base plate 16. The disk drive 10 also includes a cover plate (not shown) that is coupled to the base plate 16 and encloses the disk 12 and actuator arm assembly 18.

The actuator arm assembly 18 includes a flexure arm 20 attached to an actuator arm 22. A transducer 24 is attached to the end of the flexure arm 20. The transducer 24 is constructed to magnetize and sense the magnetic field of the disk 12. The actuator arm assembly 18 pivots about a bearing assembly 26 that is mounted to the base plate 16.

Attached to the end of the actuator arm assembly 18 is a magnet 28 located between a pair of coils 30. The magnet 28 and coils 30 are commonly referred to as a voice coil motor 32 (VCM). The spindle motor 14, transducer 24 and VCM 32 are coupled to a number of electronic circuits 34 mounted to a printed circuit board 36. The electronic circuits 34 typically include a read channel chip, a microprocessor-based controller, a random access memory (RAM) device, a voice coil motor driver, and a spindle motor driver.

The disk drive 10 typically includes a plurality of disks 12 and, therefore, a plurality of corresponding transducers 24 mounted to flexure arms 20 for the top and bottom of each disk surface. However, it is also possible for the disk drive 10 to include a single disk 12 as shown in FIG. 1.

The flexure arm 20 is manufactured to have a bias such that if the disk 12 is not spinning, the transducer 24 will come into contact with the disk surface 12. When the disk is spinning, the transducer 24 typically moves above, or below, the disk surface at a very close distance, called the fly height. This distance is maintained by the use of an air bearing, which is created by the spinning of the disk 12 surface such that a boundary layer of air is compressed between the spinning disk 12 surface and the transducer 24. The flexure arm 20 bias forces the transducer 24 closer to the disk 12 surface, while the air bearing forces the transducer 24 away from the disk 12 surface. Thus, the flexure arm 20 bias and air bearing act together to maintain the desired fly height when the disk 12 is spinning.

It will be understood that if the disk 12 is not spinning at a high enough RPM, the air bearing produced under the transducer 24 may not provide enough force to prevent the flexure arm 20 bias from forcing the transducer 24 to contact the disk 12 surface. If the transducer 24 contacts an area on the disk 12 surface that contains data, some of the data may be lost. To avoid this, the actuator arm assembly 18 is generally positioned such that the transducer 24 does not contact a data-containing area of the disk 12 when the disk 12 is not spinning, or when the disk 12 is not spinning at a high enough RPM to maintain an air bearing.

In a load/unload (L/UL) drive, the actuator arm assembly 18 is positioned such that a tab on the end of the flexure arm 20 near the transducer 24 contacts a ramp. FIG. 2 shows a front perspective representation of a ramp structure 40. As depicted by FIG. 2, a tab 42 located at the end of the flexure arm 20 contacts a ramp 44 as the actuator arm assembly 18 is moved into position on the ramp while the disk is still spinning. This positioning of the actuator arm assembly 18 on the ramp 44 keeps the transducer 24 from contacting the disk 12 surface, thus helping avoid data loss. The use of a ramp 44 may also make more of the disk 12 surface available for storing customer data, as opposed to a contact start stop (CSS) drive, which will be discussed below. However, the use of a ramp 44 may also result in the actuator arm assembly 18 not being able to move the transducer 24 over some portion of the disk 12 surface. This is because the ramp 44 may extend over a portion of the disk 12 surface, thus limiting the movement of the actuator arm assembly 18. Thus, while the entire area of the disk 12 surface could be written to if accessible, the transducer 24 may not be able to physically access some portions of the disk area, thus making it beneficial to make the ramp 44 as short as possible.

In a CSS drive, the actuator arm assembly 18 is positioned such that the transducer 24 is parked in a landing zone when the disk 12 is no longer spinning. FIG. 3 shows a representation of a disk 12 with a landing zone 50. The landing zone 50 is an area on the disk 12 surface that does not contain customer data and is designed to allow a transducer 24 to contact the disk surface. Typically, the landing zone 50 is a textured area on the disk. This area is textured in order to reduce the surface area of the transducer that comes into contact with the disk surface, thus reducing stiction problems when the disk begins to spin, as is well-known in the art. While a CSS drive does not require a ramp, it does require that a portion of the disk 12 area be available as a landing zone 50. The use of a landing zone 50 thus reduces the amount of data that a disk may store.

In normal operation, when a disk drive 10 is shut down, the control electronics 34 operate to position the actuator assembly 18 such that the transducer 24 does not contact the data containing portion of the disk 12 surface when the disk 12 stops spinning. Additionally, in normal operation, when the transducer 24 is clear of the data containing area, the control electronics 34 brake the disk 12 to stop its spinning.

Braking the spinning disk 12 is necessary because the shaft, which rotates the disk 12, is connected to the base plate 16 using a low friction bearing assembly, and would take a very long time to stop spinning if left to coast to a stop. It is beneficial to stop the disk 12 from spinning for several reasons. For example, in a CSS drive the transducer 24 contacts the disk 12 surface, thus it is beneficial to minimize the amount of time the transducer 24 is in contact with the disk 12 surface while the disk 12 is spinning. Additionally, when a disk drive 10 is powered down, it is considered non-operational. When a disk drive is non-operational, typical specifications allow the shock levels that the disk drive is able to withstand to increase, often up to levels which may result in a transducer 24 contacting the disk 12 surface. For example, in a CSS drive, the non-operational shock levels may be at a level which would allow the transducer 24 to lift from the disk 12 surface and then contact the surface again, and in some L/UL drives the actuator arm 22 may be positioned in such a manner that the transducer 24 may contact the disk 12 surface in such a situation. Therefore, it is beneficial to slow the spinning disk 12 to a stop upon powering down the disk drive so that, if a non-operational shock as described above causes the transducer 24 to contact the disk 12 surface, the area on the disk 12 surface that the transducer 24 contacts is minimized. Furthermore, some drives use latches to secure the actuator arm assembly 18 when the disk drive is powered down, as will be discussed in more detail below. In some of these drives, the latch is activated dependant upon the speed of the rotating disk. In such a situation, the spinning disk 12 may draw the parked actuator arm assembly 18 back off of the ramp. Additionally, movement of the disk drive after it is shut down may cause the actuator arm assembly 18 to move and the transducer 24 to come back out over the data containing surface and contact the surface of the disk 12. Any of these events may result in the loss of customer data.

The brake is applied by shorting the windings of the spindle motor 14. Since the spindle motor 14 is typically a three-phase motor, shorting the windings of each phase generates a force that acts against the spinning motor, and thus the motor and disk slow to a stop.

In certain situations, a disk drive 10 may lose power while a transducer 24 is flying over the disk 12 surface where customer data is stored. Such situations may, for example, include a loss of power to the computer system containing the disk drive, a power supply malfunction within the computer or disk drive, or an inadvertent disconnect of the power to the disk drive prior to the drive being shut down. In order to reduce the chances of data being lost in such situations, methods and apparatuses have been developed which position the actuator arm assembly 18 such that the transducer 24 will not contact the data-containing portion of the disk 12 surface. Additionally, it is preferable in such a situation to brake the disk 12, in order to slow it from the high RPM that it was spinning at prior to the loss of power, for the reasons discussed above.

One conventional method for parking the transducer 24 and braking the disk 12 when the disk drive loses power will now be described. Typically, loss of power to the drive is detected by using a power supply monitor circuit located within the control electronics 34. This power supply monitor includes an undervoltage detector, which monitors the power supply to the disk drive. If the power supply to the disk drive drops below a specified level, the undervoltage detector acts to reset the electronics within the drive, and actuate a retract circuit to place the actuator assembly into an automatic park cycle, which will be described in more detail below. Once the automatic park cycle is complete, a brake cycle is initiated to slow the spinning disk. This braking is typically achieved by shorting the windings of the spindle motor, as described above.

The retract circuit is typically contained within the electronic circuits 34, and is powered using the back electromotive force (BEMF) generated from the windings of the spindle motor 14. When the automatic park cycle is initiated, the retract circuit is electrically connected to the windings of the spindle motor 14. If the motor is spinning at a high enough RPM, the voltage produced on the windings can be used to operate the retract circuit. The retract circuit actuates the VCM 32 and parks the actuator arm assembly 18 to clear the transducer 24 from the area of the disk 12 surface which contains customer data. Once the actuator has been parked a latch is used to secure the actuator arm assembly 18 on the ramp or in the landing zone, thus helping to avoid any data loss. The latch is typically located at the end of the actuator arm assembly 18 near the VCM, and prevents the actuator arm assembly 18 from moving after the latch is activated.

There are a number of common latch types including magnetic, inertial, and air vane, which are well understood by those of skill in the art. Some types of latches are activated by the rotation of the spindle motor. For example, the air vane latch uses the air flow from the spinning disks to open the latch. Another example is the eddy current latch which uses an eddy current created by the spinning motor hub to open the latch. These types of latches are typically activated when the disk RPM falls below the operation RPM by a preset level. This leaves the possibility of the actuator arm assembly 18 dropping off of the ramp or coming out of the landing zone after the automatic park cycle and before the disk RPM has slowed enough to activate the latch. Thus, it would be advantageous to both brake the disk, and provide power to the retract circuit to help prevent the actuator arm assembly 18 from moving prior to the latch activating.

Another solution, used in L/UL drives, to the potential problem of the actuator arm assembly 18 being drawn back over data containing areas of the disk, is the use of a detent. This solution uses a ramp with a depression, or a bump, which helps to prevent the actuator arm assembly 18 from being pulled back off of the ramp while the disk is spinning. However, the use of a detent on the ramp of a L/UL drive requires a longer ramp compared to a ramp with no detent. Additional ramp length can reduce the available area on a disk surface that may be used to store data. Thus, it would be advantageous to reduce or eliminate the detent on such a ramp.

In addition to the problems described above, in certain situations, the BEMF generated by the spinning disk may not generate enough voltage to power the retract circuit. In such a situation, the actuator arm assembly 18 may not be properly retracted, and the transducer 24 may come into contact with a portion of the disk 12 containing customer data. Such a situation may arise, for example, when the spindle motor 14 operates using a 5 Volt driver. Due to the lower voltage of the driver, the BEMF generated from the spinning disk is reduced as compared to a spindle motor 14 which uses a 12 Volt driver. In this situation, the voltage needed to activate the VCM 32 and move the actuator arm assembly 18 may be more than the available BEMF from the spindle motor 14. Thus, it would be advantageous to be able to perform a retract function with the reduced available BEMF from a 5 Volt driver.

Another situation in which the BEMF generated by the spinning disk may not generate enough voltage to power the retract circuit may arise in a CSS drive. In a CSS drive, it is often advantageous for the transducer 24 to come out of landing zone 50 at about one-half of the final disk RPM. This is advantageous because the landing zone 50 of a CSS drive is typically textured to prevent stiction, and the height of the textured surface can be greater than the flying height. Therefore, the transducer 24 does not really "fly" when it is located over the landing zone 50. By moving the transducer out of the landing zone 50 prior to the disk being at its final RPM, transducer contact with the landing zone 50 surface is reduced. Additionally, by moving the transducer out of the landing zone 50 at reduced disk RPM, the spindle motor 14 does not need to be designed to run with the increased friction which would result from the transducer 24 contacting the landing zone 50 surface until the disk is at full RPM. However, if power is lost after the transducer 24 has left the landing zone 50, but prior to the disk spinning up to full RPM, the full BEMF voltage is not available to do a retract. This reduced BEMF may not produce enough voltage to power the retract circuit and park the actuator arm assembly 18 on the ramp or in the landing zone 50. Again, it would be advantageous to be able to perform a retract function with reduced available BEMF.

One method of overcoming these potential voltage shortages is to use a second output stage with very a low overhead full wave rectification circuit that drives the VCM 32 during power down. However, this requires additional circuitry for the second output stage, and results in an output voltage nearly equal to the voltage available at the spindle motor 14 windings. This additional circuitry adds cost to the electronic circuitry, and takes up valuable area within the electronic circuitry. This additional circuitry may also increase manufacturing costs and, hence, the cost of disk drives to consumers. Thus, it would be advantageous to provide adequate voltage to perform the retract function in a 5 Volt drive or a slowly spinning disk without requiring significant additional circuitry beyond what is currently available within the control electronics. It would also be advantageous to provide voltage to the retract circuit which is greater than the BEMF voltage available at the spindle motor 14 windings.

Accordingly, there is a need to develop a method and apparatus for use during a power loss to a disk drive which: (1) reduces the instances of the actuator arm assembly being drawn over data containing areas of the disk, (2) provides the ability to keep the actuator arm parked while also braking the disk, (3) provides the ability to perform a retract function with reduced available BEMF without the need for significant additional circuitry, and (4) provides the ability to generate voltage to retract circuit which is greater than the available BEMF voltage.

SUMMARY OF THE INVENTION

The present invention is designed to overcome the aforementioned problems and meet the aforementioned, and other, needs.

It is an object of the present invention to provide a method and apparatus for powering the VCM retract circuit while also braking the spinning disk. The present invention makes use of a DC-to-DC converter to provide power to the VCM retract circuit while simultaneously braking the disk. Thus, both the retract function and braking function are performed simultaneously. Furthermore, the VCM retract circuit may be retracted even with the disk spinning at less than full speed, and with a low voltage spindle motor driver. Accordingly, the present invention: (1) simultaneously powers the VCM retract circuit and brakes the disk, (2) does not require an additional output stage for use with a slowly spinning disk or a low voltage driver, (3) does not require a significant number of new components, and (4) is able to generate an output voltage to the VCM retract circuit that is greater than the available BEMF voltage.

Other objects, features, aspects and advantages of the invention will be apparent from the following specification taken in conjunction with the following drawings.

DETAILED DESCRIPTION OF THE PREFERRED EMBODIMENT

Figure 1:
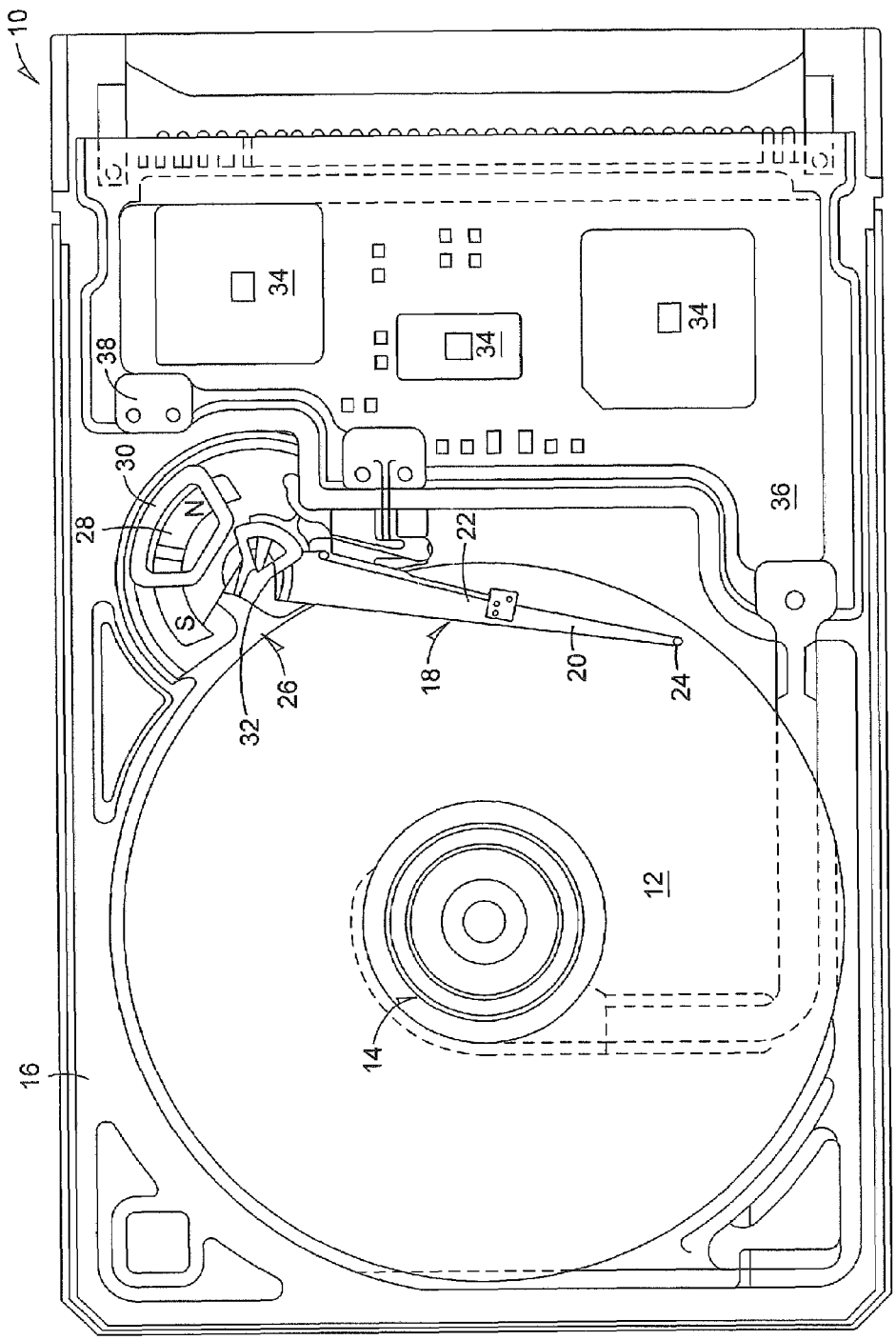
FIG. 1 is a top view diagrammatic representation of a disk drive.
Figure 2:
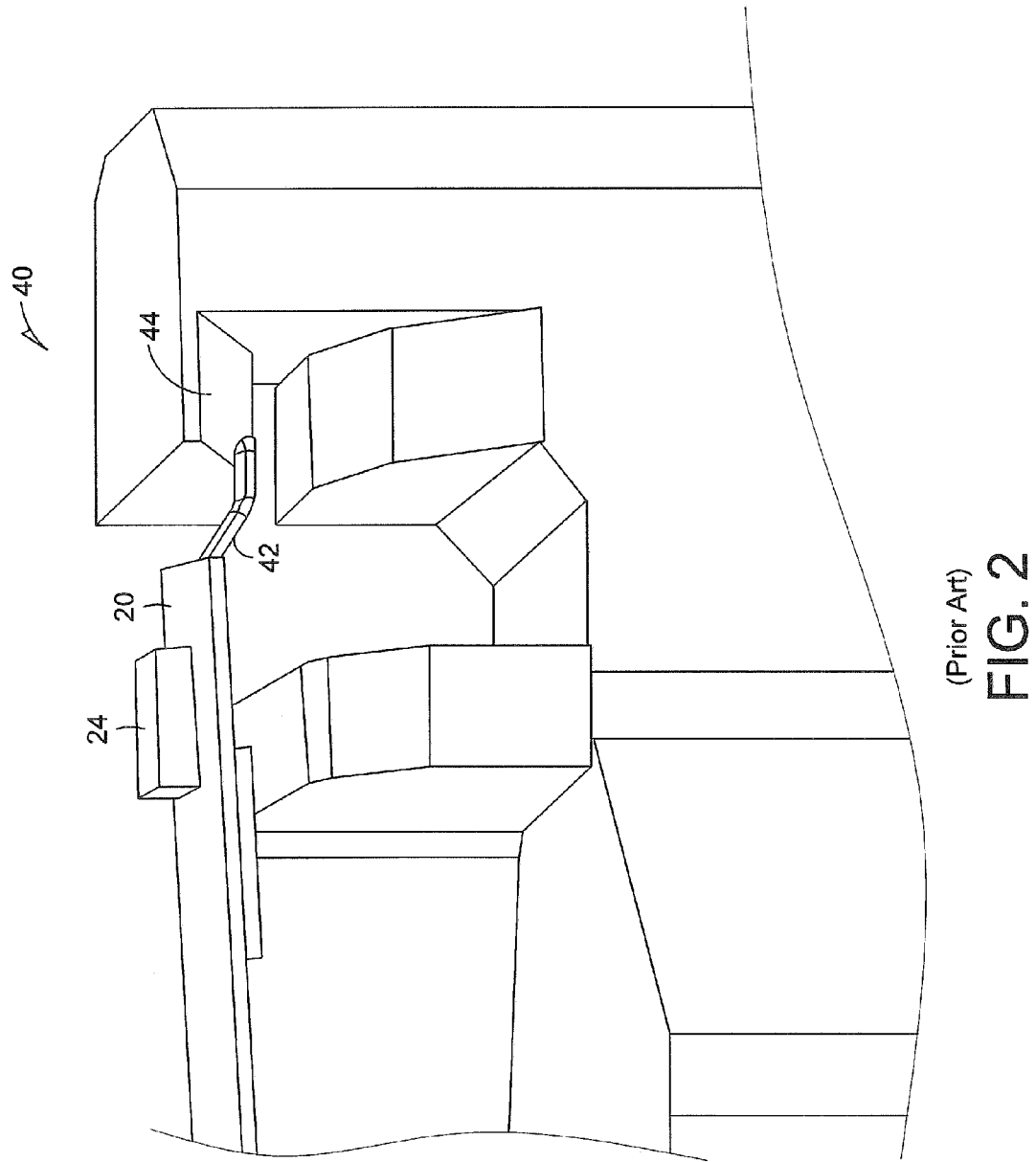
FIG. 2 is a perspective view of a ramp and an actuator arm tab which engages the ramp.
Figure 3:
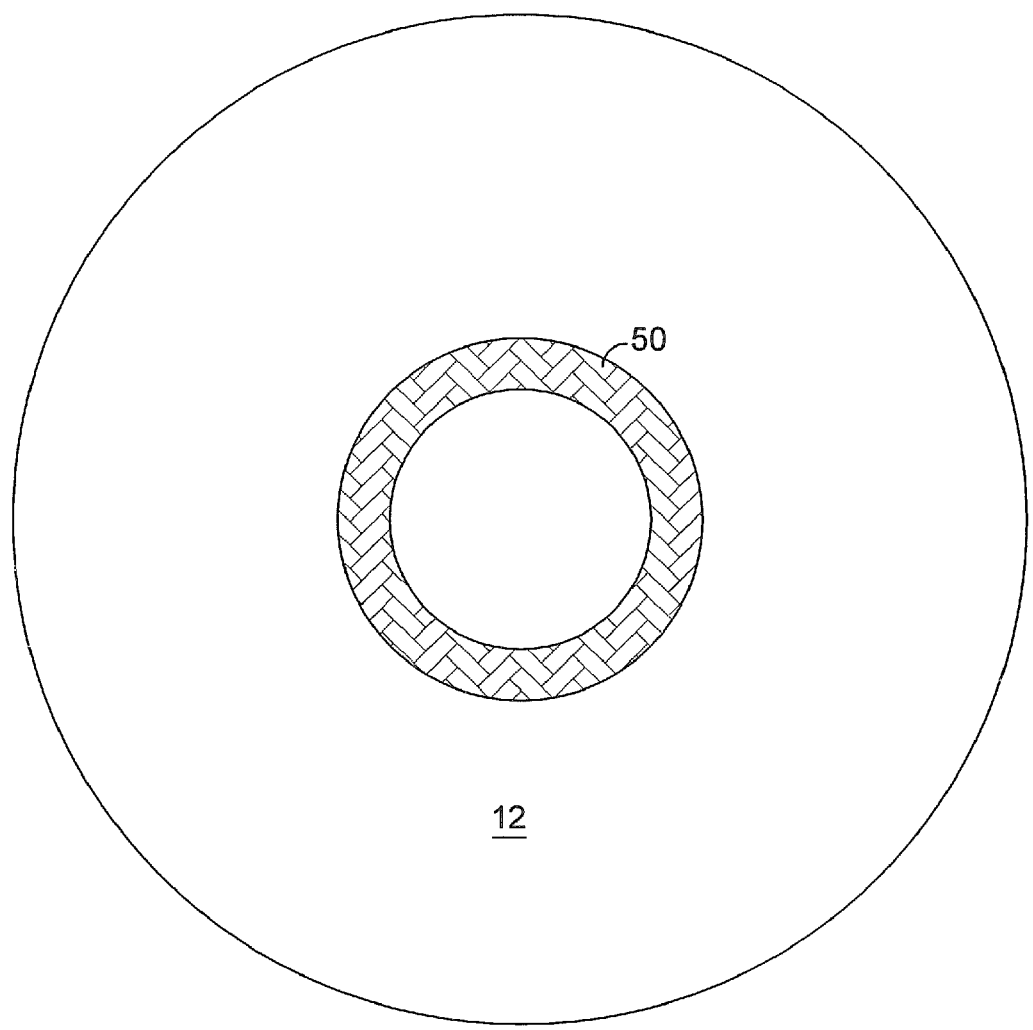
FIG. 3 is an illustration of a disk surface having a landing zone thereon.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 4:
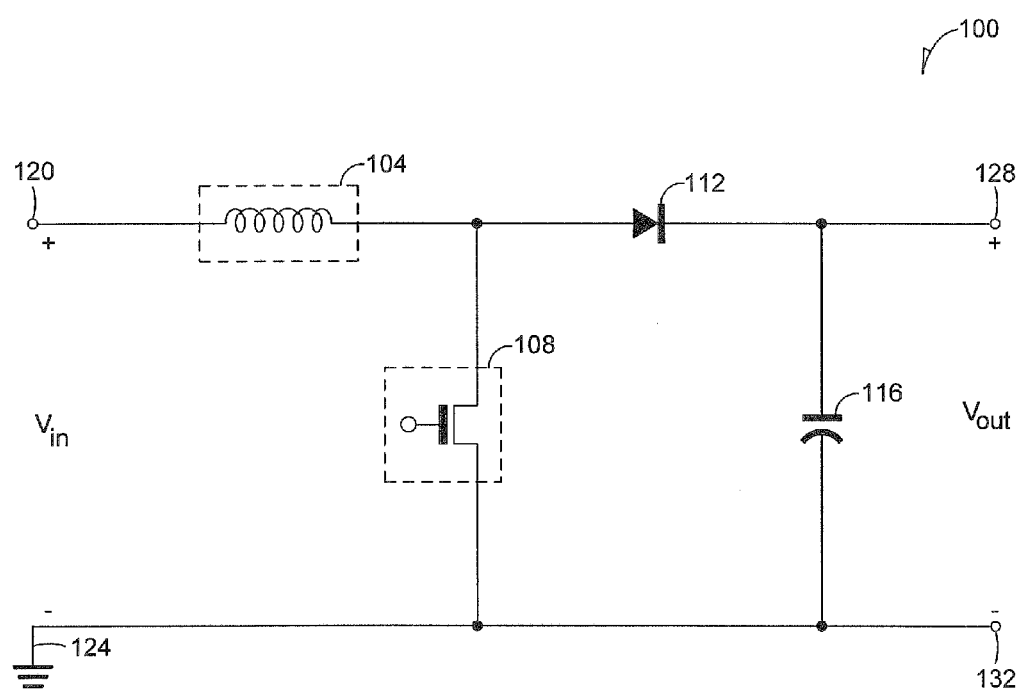
FIG. 4 is a schematic representation of a conventional DC-to-DC converter.

Referring now to FIG. 4, a conventional DC-to-DC converter 100 is shown. The circuit contains an inductor element 104, a switch element 108, a diode 112 for steering current when the switch element 108 is open, and a capacitor 116. In operation, an input voltage ($V_{in}$) is applied to the positive input terminal 120 and the negative input terminal 124. An output voltage ($V_{out}$) is generated across the positive output terminal 128 and the negative output terminal 132, which, are connected to a capacitor 116 and a load (not shown). When the switch element 108 is closed, the inductor element 104 is connected to the input voltage and the inductor element 104 stores the energy from the input voltage. When the switch element 108 is opened, the current flowing in the inductor element 104 is forced to flow through the diode 112 and into the output capacitor 116, charging it, adding voltage to the output. Ideally the output power is equal to the input power, therefore the output voltage is dependent on the impedance of the load and the duty cycle of the switch element 108 which controls the amount of power stored in the inductor 104 and delivered to the load. The duty cycle can be varied depending upon changing conditions such as input voltage or load variation to maintain a constant output voltage.

Figure 5:
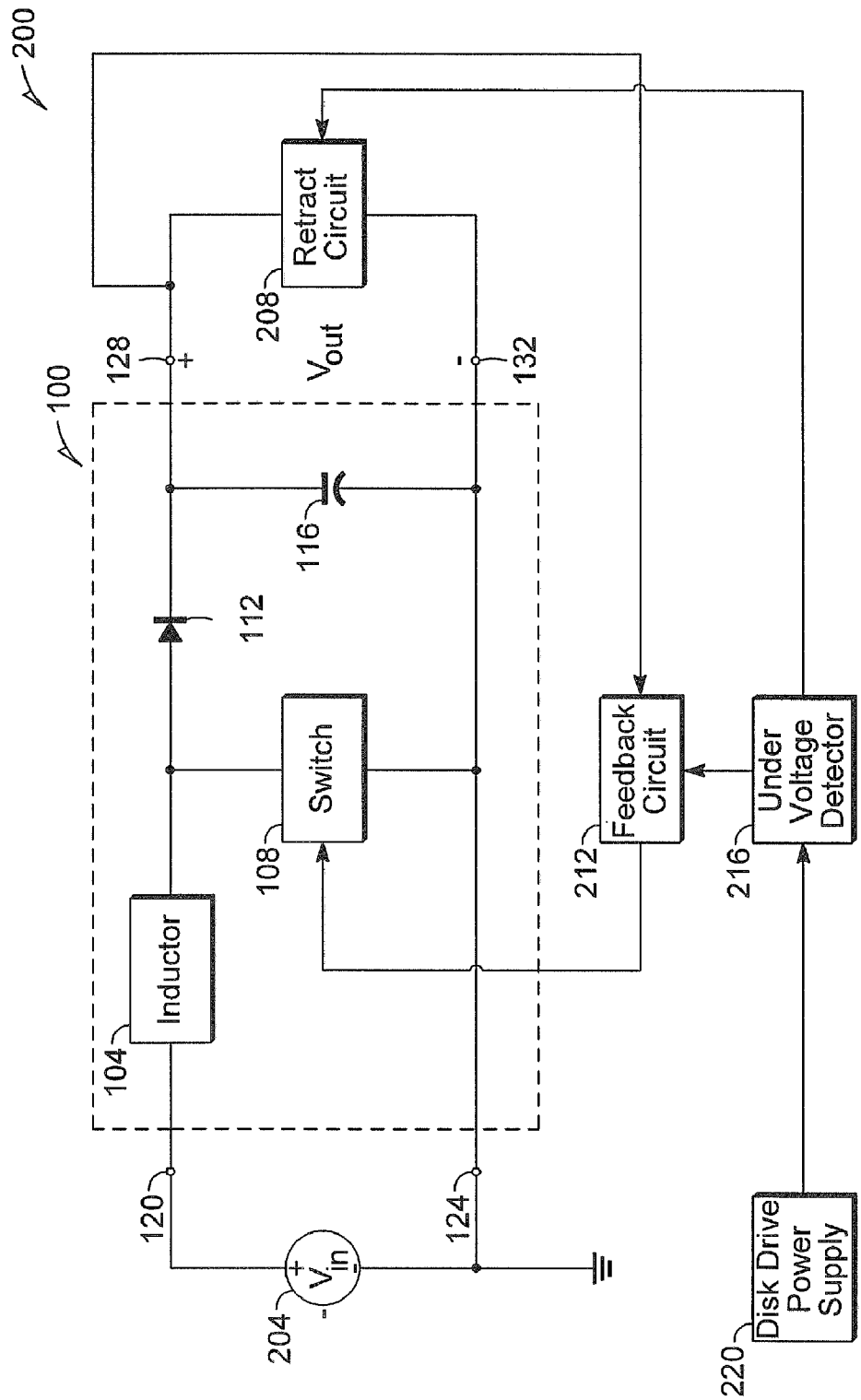
FIG. 5 is a simplified representation of one embodiment of the present invention.

Referring now to FIG. 5, a simplified block diagram of the circuit of one embodiment of the invention is shown. The circuit 200 includes a DC-to-DC converter 100 as described above, an input voltage supply 204, a retract circuit 208 attached to the output terminals 128, 132, a feedback circuit 212 which controls the operation of the switch element 108, and an undervoltage detector 216 which detects when power is lost to the disk drive.

When the undervoltage detector 216 detects that the disk drive power supply 220 is producing a voltage that has dropped below a predetermined voltage, it sends a signal indicating that such an event has occurred. This signal is received at the retract circuit 208, which initiates the retract function to clear the transducer from any data-containing area of the disk.

The feedback circuit 212, which also receives the undervoltage detector 216 signal, monitors the level of the voltage available to the retract circuit 208. If the voltage available to the retract circuit 208 is above a specified voltage, the feedback circuit 212 keeps the switch unit 108 closed. If the voltage available to the retract circuit 208 falls below the preset level, the feedback circuit 212 opens the switch unit 108 for a period of time. At the end of the time period, the feedback circuit 212 samples the output voltage available to the retract circuit 208. If this voltage is above the preset level, the feedback circuit 212 closes the switch 108. If the output voltage is still below the preset level, the feedback circuit 12 recognizes that there is no longer enough energy being generated from the BEMF to power the retract circuit 208, and the feedback circuit 212 permanently closes the switch unit 108. Thus, the disk may be braked while also providing voltage to the retract circuit.

Figure 6:
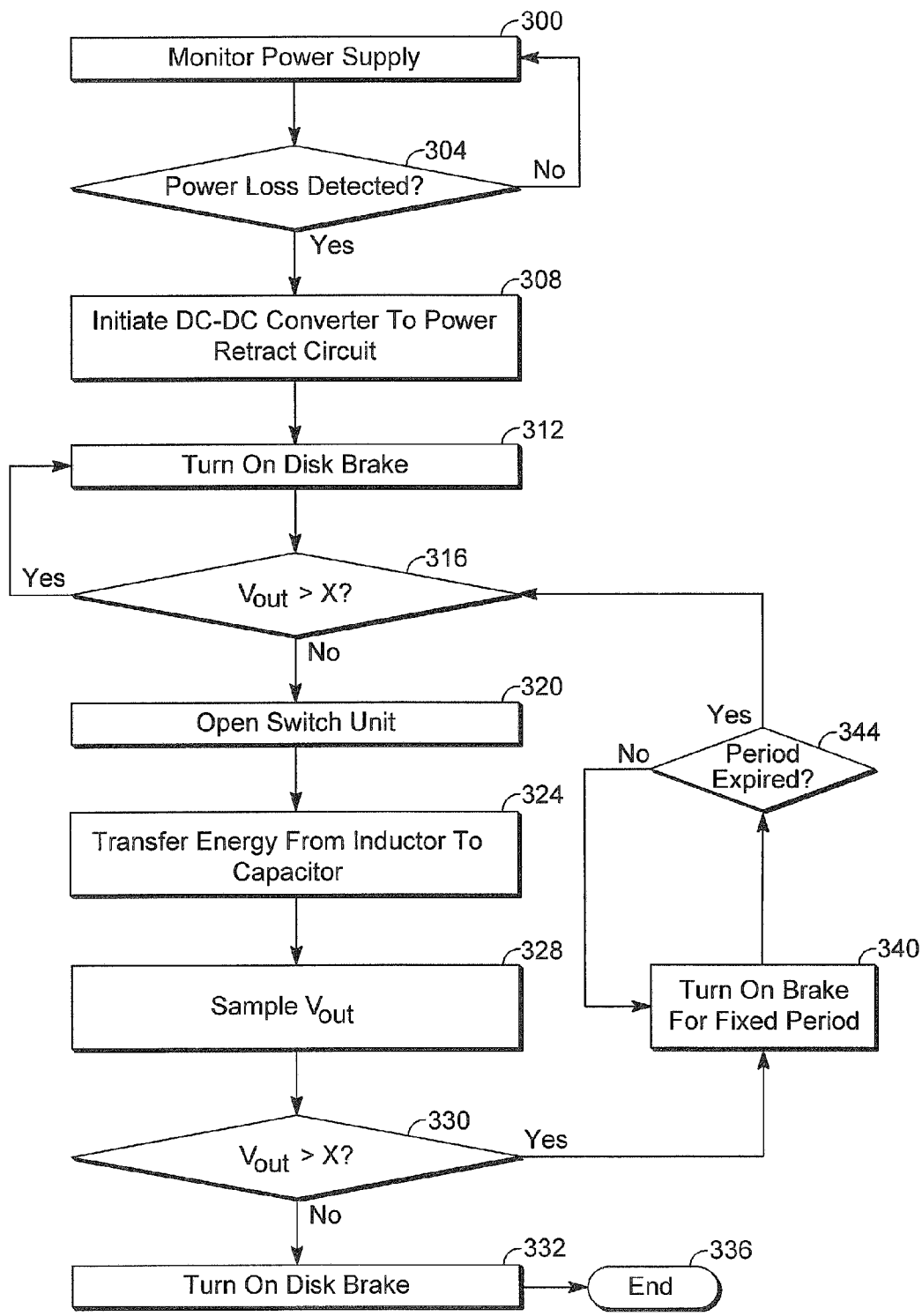
FIG. 6 is a flow chart representation of the operational steps of one embodiment of the present invention.

Referring now to FIG. 6, a flow chart for the operation of one embodiment is described. In block 300, during disk operation, the undervoltage detector monitors the power supply to the disk. While the requisite power is present, no action is taken and the undervoltage detector continues to monitor the power supply, as shown in block 304. If the undervoltage detector detects that the disk drive power supply 220 is producing a voltage that is less than a predetermined voltage, it then initiates the retract/brake cycle, which begins by enabling a DC-to-DC converter to power the retract circuit, as shown in block 308. Next the disk is braked by closing the switch unit, which shorts the spindle motor windings, shown in block 312. While the disk is braking, the DC-to-DC converter output voltage is monitored by the feedback circuit to detect when the voltage falls below a preset level, as shown in block 316.

Once the output voltage drops below this preset level, the disk brake is turned off by opening the switch, as shown in block 320. With the switch unit open, energy stored in the inductor transfers to the capacitor to increase the available output voltage, shown in block 324. Once the energy from the inductor is transferred to the capacitor, the output voltage is sampled, shown in block 328. If this voltage is greater than the preset voltage level needed to power the retract circuit, shown in block 330, the brake is again turned on, shown in block 340, for a fixed period. When the fixed period has expired, shown in block 344, the cycle is continued from block 316. If the output voltage is less than the target voltage this indicates that there is no longer enough voltage being produced by the BEMF, and the brake is turned on, shown in block 332, and the cycle is ended, shown in block 336.

It should be understood that the operation associated with FIG. 6 is just one example of a control method for the feedback circuit 212. Other control methods could be implemented which may, for example, provide more sophisticated techniques for controlling the output voltage available. Additionally, the above control method ceases activity once there is no longer enough BEMF to produce an output voltage above the preset level after the charge has been transferred in block 324. Another control method could be implemented in which the on-time period in block 340 would be dependent upon the output voltage level present at block 328.

Figure 7:
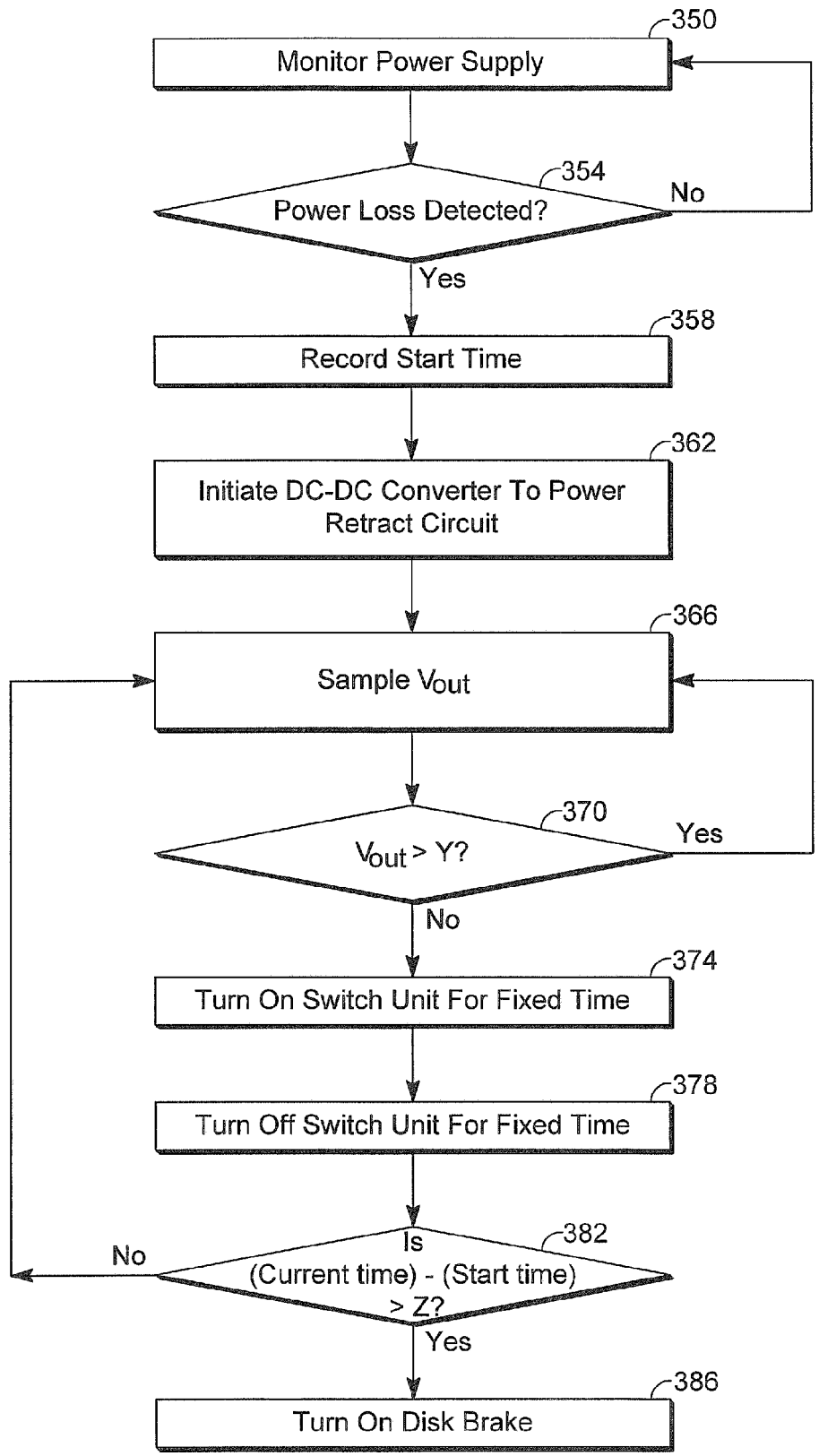
FIG. 7 is a flow chart representation of the operational steps of an alternative embodiment of the present invention.

In another embodiment, the operation of the feedback circuit is enhanced to perform the retract function with minimal braking. This embodiment would be useful in an application with a small spindle inertia. In such an application, the steps described above with reference to FIG. 6 may deplete the available energy before the retract function can be completed. In this embodiment, the retract function is completed, and then the spindle brake is applied. FIG. 7 is a flow chart representation of the retract function of this embodiment. Initially, as indicated by block 350, the power supply is monitored. If a power loss is detected, as noted by block 354, the start time is recorded, as noted by block 358. If no power loss is detected at block 354, the power supply continues to be monitored. After recording the start time, a DC-DC converter is initiated to power the retract circuit, as indicated by block 362. Next, the output voltage, Vout, is sampled, noted by block 366. The output voltage is then compared to a preset value, Y, which is a voltage which is able to power the retract circuit, as noted by block 370. If Vout is greater than Y, the output voltage continues to be monitored, as indicated by block 366. If Vout is at or below Y, the switch unit is turned on for a fixed time period, indicated by block 374. Following the fixed on time period, the switch unit is turned off for a fixed time, as noted by block 378. Following the fixed off time period, the current time minus the start time is compared to a preset time period Z, which is a time period set to allow a full retract function, as indicated by block 382. If the preset time period has not yet elapsed, the steps of blocks 366 through 382 are repeated. If the preset time period has expired, the disk brake is turned on to slow the spinning disk to a stop, as noted by block 386.

Additionally, it will be understood that the above operations can be implemented using either hardware or software. A hardware implementation will be described in detail below, with the understanding that software could also be used to provide the control to the DC-to-DC converter.

Figure 8:
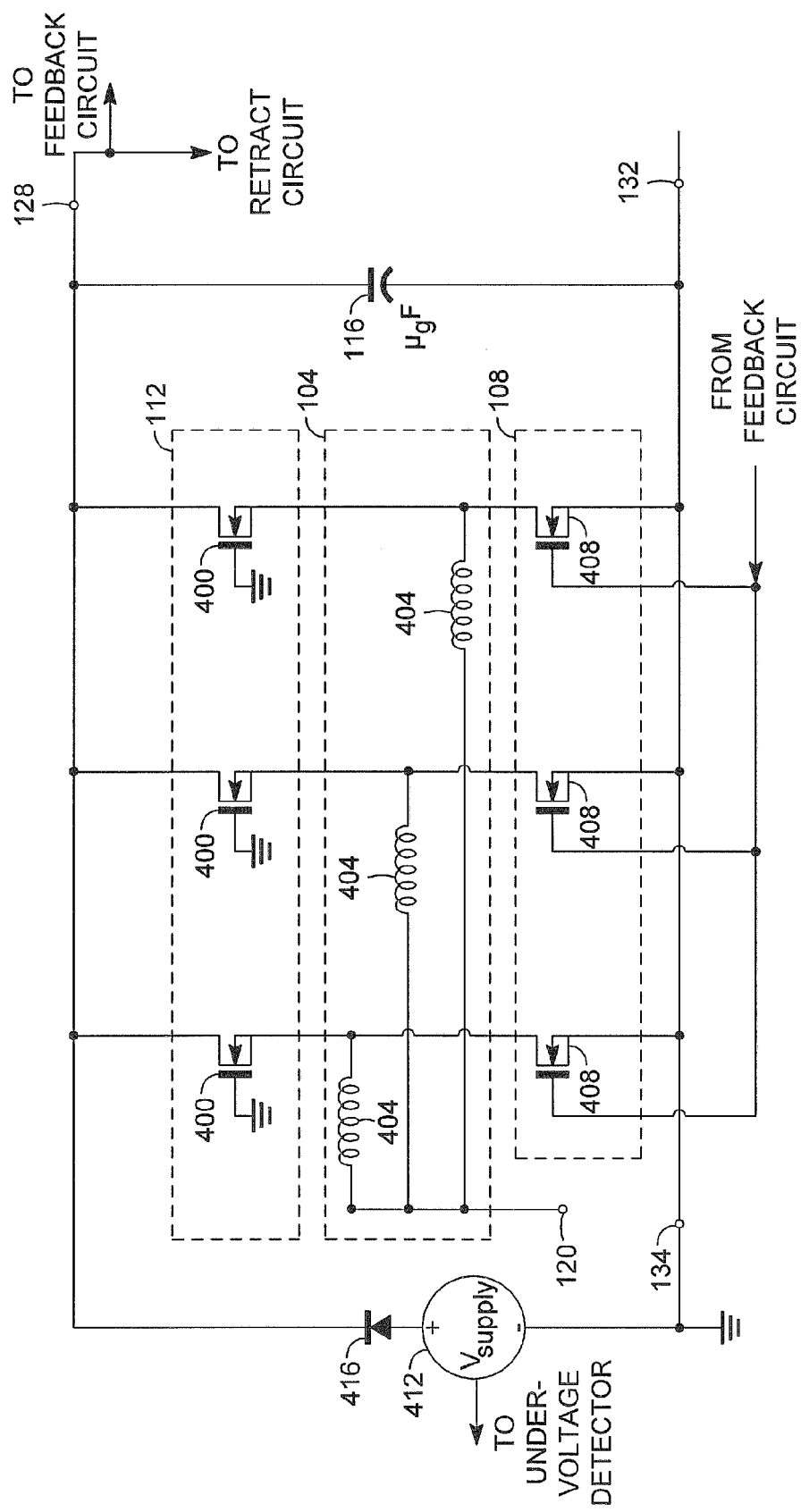
FIG. 8 is a schematic representation of the DC-to-DC converter of one embodiment of the present invention.

In one embodiment, shown in FIG. 8, the windings of the three phase spindle motor are used as inductor of the DC-to-DC converter, and the BEMF generated by the spindle motor is used as the input voltage to the DC-to-DC converter. In this embodiment, the power MOSFETs used to drive the spindle motor are used as both the switch unit 108 of the DC-to-DC converter, and the diode unit 112 of the DC-to-DC converter. The MOSFETs used in this embodiment are IRFR020 N-channel power MOSFETs, which are widely available standard components. As shown in the circuit diagram representation of FIG. 8, the upper MOSFETs 400, connected to the positive supply and the spindle motor windings 404, are used as the diode unit 112. As will be understood by those of skill in the art, the power MOSFETs used in this embodiment contain an internal body diode. Thus when the gate connections of the upper MOSFETs 400 are connected to ground, the units act as diodes.

The lower MOSFETs 408, connected to ground and the spindle motor windings 404, are used as the switch unit 108 of the DC-to-DC converter. When voltage is present at the gates of the lower MOSFETs 408, the MOSFETs 408 act as a short to ground. Thus, when the lower MOSFETs 408 have a gate voltage, the spindle motor windings 404 are shorted to ground, and act to brake the spinning disk. When the gate voltage is removed on the lower MOSFETs 408, the spindle motor windings 404 release stored energy into the capacitor 116 through the upper MOSFET 400 body diodes. The spindle motor windings 404 store energy from the BEMF of the spinning disk. In one embodiment, the capacitor 116 is a 22 µF capacitor and is available from the input voltage supply line existing in the disk drive, as will be understood by those of skill in the art. It will also be understood that the value of the capacitor is a design consideration, and the value of the capacitor may be less or more, depending upon requirements for the specific application.

Prior to a power loss, an input power supply 412 supplies power to the spindle motor. When power is lost, the input power supply no longer supplies power, and must be isolated from the spindle motor windings 404 to insure proper braking and retract circuit operation. This is accomplished by the use of a blocking diode 416. The blocking diode helps to prevent current from the spindle motor windings 404 from flowing back into the input power supply 412.

Accordingly, by using the DC-to-DC converter of this embodiment, a high enough voltage can generally be maintained to power the retract circuit even if the disk is spinning at a relatively low RPM. Additionally, since the windings are shorted when the switch unit 108 is closed, the disk is also braked. Thus, the disk is braked while also powering the retract circuit 208.

Figure 9:
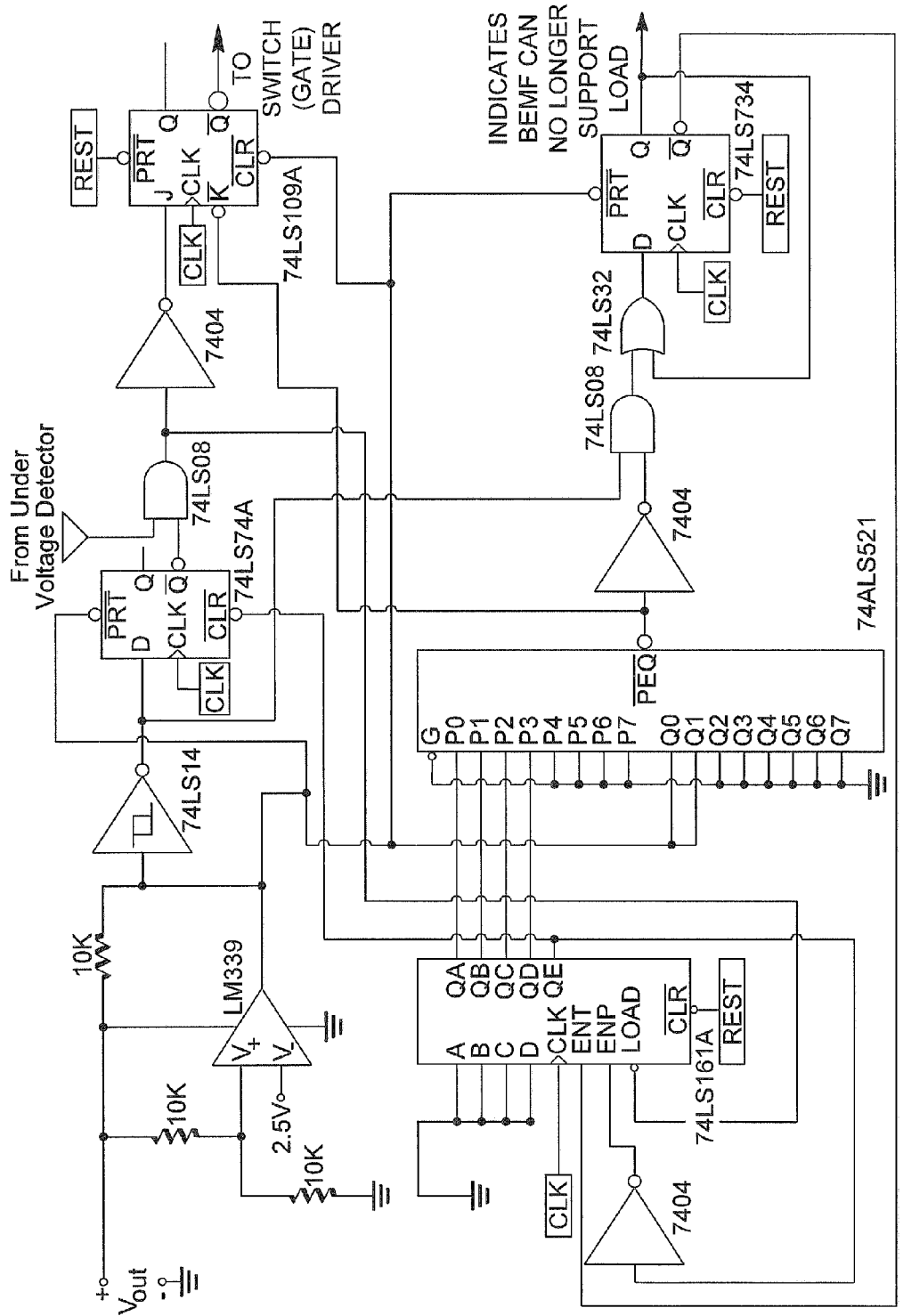
FIG. 9 is a schematic representation of the feedback circuit of one embodiment of the present invention.

FIG. 9 shows a detailed circuit diagram of one embodiment of the feedback circuit of the present invention. As will be understood by those of skill in the art, the circuit represented in FIG. 9 will provide the operation as described above in connection with FIG. 6. Additionally, it should be understood that the components listed in the circuit diagram are representative of components that may be used to implement this embodiment. The embodiment may also be implemented using equivalent circuitry available in ASIC chips that are used in the electronics circuitry of a disk drive. Thus, the embodiment may be implemented without significant additional hardware requirements.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. An apparatus for retracting a disk drive actuator arm assembly, said actuator arm assembly including a transducer head, wherein said transducer head reads data from and writes data to a disk surface, comprising:
    a spindle motor which generates a back electromotive force voltage, said spindle motor including spindle motor windings;
    a DC-to-DC converter circuit connected to said spindle motor which converts said back electromotive force voltage into an output voltage;
    a feedback circuit connected to said DC-to-DC converter and controlling switching thereof;
    a retract circuit, connected to said DC-to-DC converter and powered thereby; and
    a voice coil motor activated by said retract circuit and operating to retract said actuator arm assembly by moving said transducer head from a location above or below a data containing area of said disk surface to a location that is not above or below a data containing area of said disk surface, wherein the spindle motor is braked by shorting the spindle motor windings while the actuator arm assembly is being retracted and while said transducer head is at a location above or below a data containing area of said disk surface.

2. The apparatus of claim 1 wherein said DC-to-DC converter includes an inductor, a switch, a diode, and a capacitor.

3. The apparatus of claim 2, wherein windings of said spindle motor are used as said inductor.

4. The apparatus of claim 1, wherein said output voltage is larger than said back electromotive force voltage.

5. The apparatus of claim 1, wherein said retract circuit is connected to an output portion of said DC-to-DC converter and is powered by said output voltage.

6. The apparatus of claim 2, wherein said feedback circuit comprises comparison circuitry for comparing said output voltage of said DC-to-DC converter to a predefined target voltage.

7. The apparatus of claim 6, wherein said feedback circuit opens said switch based upon a comparison of said output voltage to said predefined target voltage.

8. The apparatus of claim 7 wherein said feedback circuit further comprises timing circuitry.

9. The apparatus of claim 8 wherein said timing circuitry has a fixed off-period timer wherein said switch is closed following said fixed off-period.

10. The apparatus of claim 9 wherein said feedback circuit includes low voltage limit circuitry, wherein said switch is closed permanently based upon said output voltage level following said fixed off-period.

11. The apparatus of claim 8 wherein said timing circuitry has a variable off-period timer wherein said switch is closed following said variable off-period.

12. The apparatus of claim 11 wherein said variable off-period is adjusted dependent upon said output voltage of said DC-to-DC converter during said variable off-period.

13. The apparatus of claim 8 wherein said timing circuitry has a variable on-period timer wherein said switch is closed during said variable on-period.

14. The apparatus of claim 13 wherein said variable on-period is adjusted dependent upon said output voltage of said DC-to-DC converter during said variable on-period.

15. The apparatus of claim 11 wherein said timing circuitry has a maximum value for said variable off-period.

16. The apparatus of claim 15 wherein said variable off-period is adjusted based upon said output voltage of said DC-to-DC converter during said variable off-period.

17. The apparatus of claim 16 wherein said switch is closed permanently upon said variable off-period reaching said maximum value.

18. A method for powering a retract circuit in a disk drive, comprising:
    detecting that power has been lost to said disk drive;
    initiating a retract cycle to park an actuator arm assembly, said actuator assembly including a transducer head, wherein said transducer reads data from and writes data to a disk surface;
    using a back electromotive force generated from a spinning spindle motor to generate a back electromotive force voltage;
    implementing a DC-to-DC converter to generate an output voltage higher than the back electromotive force voltage;
    activating said retract circuit using said output voltage; and
    repositioning an actuator arm assembly using said retract circuit while braking the spinning spindle motor, wherein said spindle motor includes spindle motor windings that are shorted in order to brake the spindle motor and wherein said spindle motor is braked while the transducer head is located above or below a data containing area of said disk surface.

19. The method as claimed in claim 18, wherein said implementing step comprises:
    closing a switch in said DC-to-DC converter;
    storing energy in an inductor at a first voltage level;
    opening said switch in said DC-to-DC converter; and
    steering said stored energy into a capacitor to store the energy at said output voltage level.

20. The method of claim 18, further comprising comparing said output voltage to a predefined target voltage.

21. The method of claim 20 wherein said activating step is initiated based upon said comparing step.

22. The method of claim 21 further comprising secondly comparing said output voltage to said predefined target voltage following said activating step.

23. The method of claim 22 wherein a permanent brake cycle is initiated based on said secondly comparing step.

24. An apparatus for retracting a disk drive actuator arm assembly, said actuator arm assembly including a transducer head; wherein said transducer head reads data from and writes data to said disk surface, comprising:
   retract means for retracting said disk drive actuator arm assembly;
   motor means for generating a back electromotive force voltage, wherein said motor means includes motor means windings;
   converter means for converting said back electromotive force voltage into an output voltage for powering said retract means, wherein said retract means retract said disk drive actuator arm assembly while said motor means are braked, wherein said motor means are braked by shorting the motor means windings while said transducer head is at a location above or below a data containing area of said disk surface; and
   feedback means for controlling said converter means.

25. The apparatus of claim 24, wherein said feedback means comprises:
   comparison means for comparing said output voltage to a predefined target voltage;
   switch means for switching said converter means; and
   timer means for timing said switch means.

26. An apparatus for retracting a disk drive actuator arm assembly, said actuator arm assembly including a transducer head, wherein said transducer head reads data from and writes data to said disk surface, comprising:
   a spindle motor which generates a back electromotive force voltage, said spindle motor including a spindle motor winding;
   a DC-to-DC converter circuit connected to said spindle motor which converts said back electromotive force voltage into an output voltage;
   a feedback circuit connected to said DC-to-DC converter and controlling switching thereof;
   a retract circuit, connected to said DC-to-DC converter and powered thereby; and
   a voice coil motor activated by said retract circuit and operating to retract said actuator arm assembly by moving said transducer head from a location above or below a data containing area of said disk surface to a location that is not above or below a data containing area of said disk surface, wherein said spindle motor is braked by shorting said spindle motor winding while said actuator arm assembly is being retracted and while said transducer head is at a location above or below a data containing area of said disk surface, and wherein said feedback circuit comprises comparison circuitry for comparing said output voltage of said DC-to-DC converter to a predefined target voltage.

27. The apparatus of claim 26, wherein said feedback circuit opens said switch based upon a comparison of said output voltage to said predefined target voltage.

28. A method for powering a retract circuit in a disk drive, comprising:
   detecting that power has been lost to said disk drive;
   initiating a retract cycle to park an actuator arm assembly, said actuator assembly including a transducer head, wherein said transducer head reads data from and writes data to a disk surface;
   using a back electromotive force generated from a spinning spindle motor to generate a back electromotive force voltage, said spindle motor including spindle motor windings;
   implementing a DC-to-DC converter to generate an output voltage;
   activating said retract circuit using said output voltage;
   repositioning said actuator arm assembly using said retract circuit, wherein said spindle motor is braked while repositioning said actuator arm assembly by shorting the spindle motor windings and while said transducer head is at a location above or below a data containing area of said disk surface; and,
   comparing said output voltage to a predefined target voltage.

29. The method of claim 28 further comprising secondly comparing said output voltage to said predefined target voltage following said activating step.

30. An apparatus for retracting a disk drive actuator arm assembly, said actuator arm assembly including a transducer head, wherein said transducer head reads data from and writes data to said disk surface, comprising:
   retract means for retracting said disk drive actuator arm assembly;
   motor means for generating a back electromotive force voltage, wherein said motor means includes motor means windings and wherein the motor means is braked while the actuator arm assembly is being retracted by shorting the motor means windings while said transducer head is at a location above or below a data containing area of said disk surface;
   converter means for converting said back electromotive force voltage into an output voltage for powering said retract means; and
   feedback means for controlling said converter means, wherein said feedback means comprises:
      comparison means for comparing said output voltage to a predefined target voltage;
      switch means for switching said converter means; and
      timer means for timing said switch means.

31. A method comprising the steps of:
   providing a disk drive having a disk, a spindle motor for rotating the disk, and a transducer head for reading data from said disk;
   after power has been lost to the disk drive, retracting said transducer head using a back electromotive force generated from the spindle motor while braking the spindle motor, wherein said spindle motor includes a spindle motor winding and wherein said spindle motor is braked by shorting the spindle motor winding while the transducer head is at a location above or below a data containing area of said disk.

* * * * *

UNITED STATES PATENT AND TRADEMARK OFFICE
CERTIFICATE OF CORRECTION

PATENT NO.      : 7,633,702 B1                                   Page 1 of 1
APPLICATION NO. : 09/820415
DATED           : December 15, 2009
INVENTOR(S)     : Mark Heimbaugh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2105 days.

Signed and Sealed this

Ninth Day of November, 2010

David J. Kappos
*Director of the United States Patent and Trademark Office*